United States Patent
Ishii

[11] Patent Number: 5,991,242
[45] Date of Patent: Nov. 23, 1999

[54] MAGNETIC HEAD DRIVE DEVICE, AND MAGNETO-OPTICAL RECORDING APPARATUS USING THE SAME

[75] Inventor: Kazuyoshi Ishii, Tokyo, Japan

[73] Assignee: Canon Kabushiki Kaisha, Tokyo, Japan

[21] Appl. No.: 09/144,631

[22] Filed: Aug. 31, 1998

[30] Foreign Application Priority Data

Sep. 3, 1997 [JP] Japan .................................. 9-238281

[51] Int. Cl.$^6$ .............................. G11B 11/00; G11B 5/02
[52] U.S. Cl. ................................ 369/13; 360/59; 360/114
[58] Field of Search ........................... 369/13, 124, 146; 360/114, 59, 66–68, 46, 123; 361/156, 143, 152

[56] References Cited

U.S. PATENT DOCUMENTS

| | | | |
|---|---|---|---|
| 4,937,802 | 6/1990 | Omori et al. | 369/13 |
| 5,351,155 | 9/1994 | Ishii | 360/46 |
| 5,377,055 | 12/1994 | Ishii | 360/59 |
| 5,448,422 | 9/1995 | Hiramatsu | 360/59 |
| 5,559,763 | 9/1996 | Ishii | 369/13 |
| 5,574,702 | 11/1996 | Ishii | 369/13 |
| 5,579,293 | 11/1996 | Ishii | 369/13 |
| 5,586,091 | 12/1996 | Ishii et al. | 369/13 |
| 5,661,612 | 8/1997 | Hasegawa et al. | 360/59 |

FOREIGN PATENT DOCUMENTS 3-242845   10/1991   Japan .
6-290496   10/1994   Japan .

*Primary Examiner*—Ali Neyzari
*Attorney, Agent, or Firm*—Fitzpatrick, Cella, Harper & Scinto

[57] ABSTRACT

A magnetic head drive device includes a magnetic head having a main coil for magnetic field generation. Current is supplied to the main coil via first to fourth current supply channels. A first auxiliary coil is provided in the first current supply channel through which current is supplied to the main coil from a first direction. A second auxiliary coil is provided in the second current supply channel through which current is supplied to the main coil from a second direction opposite to the first direction. The third current supply channel is provided to be connected in parallel with the first current supply channel so as to supply current to the main coil from the first direction. The fourth current supply channel is provided to be connected in parallel with the second current supply channel so as to supply current to the main coil from the second direction. The first to fourth current supply channels are controlled in accordance with a control signal for designating a given operation mode. When a first operation mode in which the magnetic head generates a modulated magnetic field is designated, the first to fourth current supply channels are controlled to supply a current modulated in accordance with an information signal to be recorded to the main coil. When a second operation mode in which the magnetic head generates a magnetic field in a predetermined direction is designated, the first to fourth current supply channels are controlled to supply a current to the main coil from one predetermined direction.

8 Claims, 6 Drawing Sheets

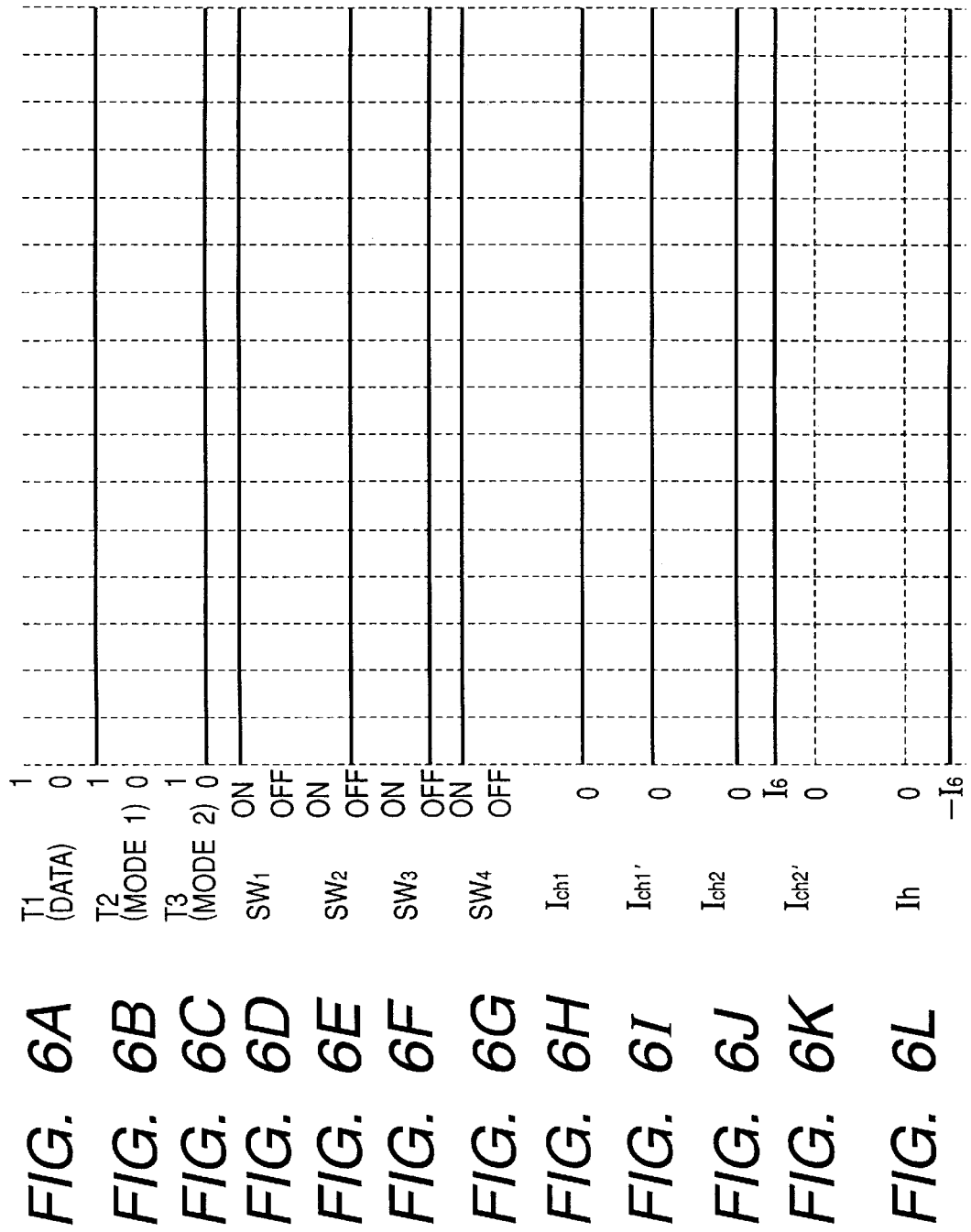

MAGNETIC HEAD DRIVE DEVICE, AND MAGNETO-OPTICAL RECORDING APPARATUS USING THE SAME

BACKGROUND OF THE INVENTION

1. Field of the Invention

The present invention relates to a magnetic head drive device for driving a magnetic head by supplying a drive current thereto so as to record an information signal on a magneto-optical recording medium, and a magneto-optical recording apparatus using the same.

2. Related Background Art

Conventionally, as a magneto-optical recording apparatus for recording an information signal on a magneto-optical recording medium such as a magnetooptical disk or the like at high density, an apparatus using a magnetic field modulation scheme is known. A magnetic field modulation magneto-optical recording apparatus comprises an optical head, a magnetic head, a magnetic head drive device, and drive means for driving a magneto-optical recording medium. When an information signal is recorded on a magneto-optical recording medium using such a magneto-optical recording apparatus, the optical head irradiates a high-power laser beam focused to a small beam spot onto a magnetic layer of the magneto-optical recording medium while driving the magneto-optical recording medium relative to the optical head and magnetic head. At the same time, the magnetic head drive device supplies a current modulated by the information signal to the magnetic head, so that the magnetic head perpendicularly applies a magnetic field modulated according to the information signal to the portion irradiated with the laser beam of the magneto-optical recording medium. As a result, a magnetic domain, the direction of magnetization of which changes in correspondence with the direction of magnetic field applied, is formed in the magnetic layer, thus recording the information signal. Using such a magnetic field modulation scheme, an information signal can be recorded at a very high density.

When the information signal recorded in this way is to be reproduced, the magneto-optical recording medium is driven, and at the same time, the optical head irradiates a lower-power laser beam than that upon recording, which is focused to a small beam spot, onto the magnetic layer of the magneto-optical recording medium. In this case, since the plane of polarization of the laser beam reflected by the magnetic layer rotates in correspondence with the direction of magnetization of the magnetic domain, it is detected by a photosensor provided to the optical head, and the information signal is reproduced based on the detection signal.

Superresolution reproduction is conventionally known. This technique uses a magneto-optical recording medium, a magnetic layer of which is comprised of a plurality of layers including at least a recording layer and reproduction layer, and transfers magnetization formed in the recording layer to the reproduction layer. Up on reproduction of an information signal, a laser beam is irradiated onto the magnetic layer, and at the same time, a magnetic field applying means applies a given magnetic field, so that the magnetization in a local region of the reproduction layer, which has reached high temperature upon irradiation of the laser beam, is switched in the direction of the applied magnetic field, irrespective of the magnetization formed in the recording layer, thus detecting a magnetic domain smaller than the beam spot size.

Especially, Japanese Patent Laid-Open Application No. 3-242845 has proposed a recording/reproduction scheme in which an information signal is recorded by magnetic field modulation, and the recorded information signal is reproduced by superresolution reproduction. With this scheme, an information signal can be recorded at a very high density, and the recorded information signal can be reproduced with high resolution.

However, conventionally, inorder to attain superresolution reproduction, a means for applying a given magnetic field is required in addition to a magnetic field applying means for magnetic field modulation recording, even though superresolution reproduction is possible to attain. For this reason, magnetic heads for magnetic field modulation and superresolution reproduction, and their drive devices must be independently equipped, and an expensive apparatus with a complicated arrangement is required.

SUMMARY OF THE INVENTION

The present invention has been made in consideration of the conventional problems, and has as its object to provide a magnetic head drive device and magneto-optical recording apparatus, which can generate a modulated magnetic field and another magnetic field for, e.g., superresolution reproduction by a simple arrangement.

In order to achieve the object of the present invention, there is provided a magnetic head drive device comprising first and second current supply means, respectively including at least auxiliary coils, for supplying currents to a main coil of a magnetic head for magnetic field generation from one direction and a direction opposite to the one direction, respectively, third and fourth current supply means, arranged in parallel with the first and second current supply means, respectively, for supplying currents to the main coil of the magnetic head from the one direction and the direction opposite to the one direction, respectively, and means for controlling the first to fourth current supply means in accordance with a control signal which designates an operation mode, wherein when a first operation mode in which the magnetic head generates a modulated magnetic field is designated, the first to fourth current supply means are controlled to supply currents modulated according to an information signal to be recorded to the main coil, and when a second operation mode in which the magnetic head generates a magnetic field in a given direction is designated, the first to fourth current supply means are controlled to supply currents to the main coil from one predetermined direction.

Also, in order to achieve the object of the present invention, there is provided a magneto-optical recording apparatus having the magnetic head drive device.

BRIEF DESCRIPTION OF THE DRAWINGS

FIGS. 6A, 6B, 6C, 6D, 6E, 6F, 6G, 6H, 6I, 6J, 6K and 6L are charts showing signals of the respective units of the magnetic head drive device when the apparatus shown in FIG. 5 is in an erase mode.

DETAILED DESCRIPTION OF THE PREFERRED EMBODIMENTS

Figure 1:
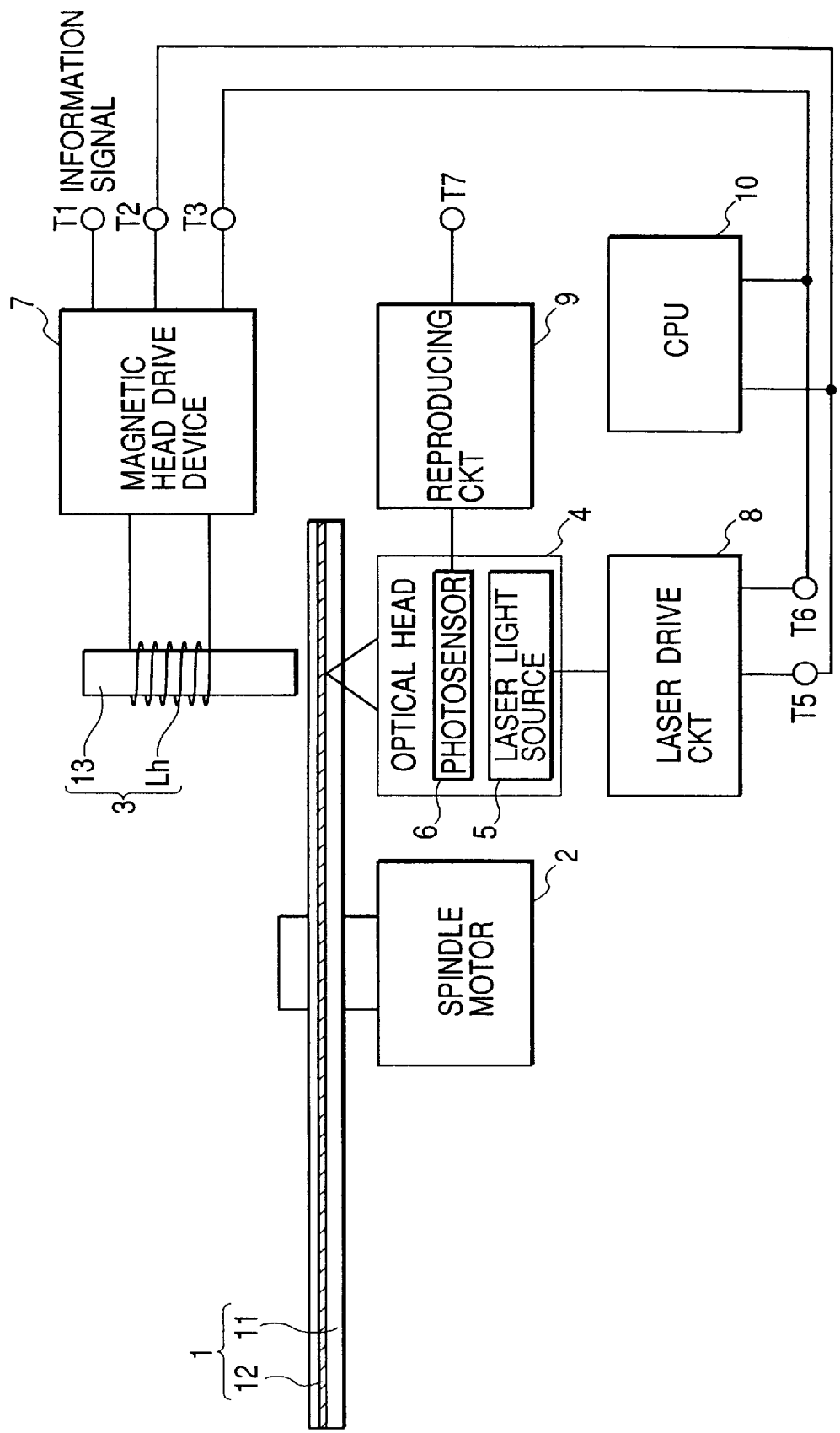
FIG. 1 is a block diagram showing a magneto-optical recording apparatus according to the first embodiment of the present invention.

The preferred embodiments of the present invention will be described in detail hereinafter with reference to the accompanying drawings. FIG. 1 shows the arrangement of a magneto-optical recording apparatus according to the first embodiment of the present invention. In FIG. 1, a magneto-optical disk 1 serves as a magneto-optical recording medium used for recording information. The disk 1 is prepared by forming a magnetic layer 12 consisting of a magnetic material on a substrate 11 made of a transparent material. The magnetic layer 12 is comprised of a plurality of layers including at least a recording layer and reproduction layer. The disk 1 is rotated by a spindle motor 2. A magnetic head 3 is placed above the upper surface side of the disk 1, and an optical head 4 is placed below its lower surface side to oppose the magnetic head 3.

The magnetic head 3 is constructed by a core 13 consisting of a magnetic material, and a main coil Lh for magnetic field generation, which surrounds the core 13. The main coil Lh is connected to a magnetic head drive device 7. The optical head 4 is constituted by a laser light source 5, a photosensor 6, and an optical system (not shown) for irradiating a focused laser beam onto the magnetic layer 12 of the disk 1. The laser light source 5 is connected to a laser drive circuit 8, and the photosensor 6 is connected to a reproducing circuit 9.

The magnetic head drive device 7 and laser drive circuit 8 operate on the basis of a control signal output from a CPU (Central Processing Unit) 10. The magnetic head drive device 7 has a terminal T1 that receives the information signal to be recorded, and terminals T2 and T3 that receive the control signal from the CPU 10. The laser drive circuit 8 has terminals T5 and T6 that receive the control signal from the CPU 10. When an information signal is recorded on the disk 1, the laser drive circuit 8 supplies a DC current or a pulse current synchronous with a clock signal of a predetermined frequency to the laser light source 5 in accordance with the control signal from the CPU 10, while the disk 1 is driven to rotate by the spindle motor 2. With this current, the laser light source 5 produces a high-power laser beam which is constant or pulse-modulated by the clock signal, and this laser beam is focused to a small beam spot by the optical system and is irradiated onto the magnetic layer 12.

In this case, focus control and tracking control are performed under the control of a servo control circuit (not shown), and the beam spot from the optical head 4 scans to follow an information track on the disk 1. Simultaneously with scanning of the beam spot, the magnetic head drive device 7 supplies a current modulated by the information signal to be recorded to the main coil Lh of the magnetic head 3 in response to the control signal from the CPU 10. With this current, the magnetic head 3 generates a magnetic field modulated by the information signal, and perpendicularly applies it to that portion of the magnetic layer 12, which is irradiated with the laser beam. As a result, a magnetic domain, in which the direction of magnetization changes in correspondence with the direction of magnetic field applied, is formed in the recording layer that forms the magnetic layer 12, and the magnetization formed in the recording layer is transferred to the reproduction layer. In this manner, the information signal is recorded on the magnetic layer 12 of the disk 1.

When the recorded information signal is reproduced by the aforementioned superresolution reproduction, the laser drive circuit 8 supplies a DC current to the laser light source 5 in accordance with the control signal from the CPU 10, while the disk 1 is driven to rotate. The laser light source 5 emits a low-power laser beam, which is focused to a small beam spot by the optical system, and scans on the information track of the disk 1. At the same time, the magnetic head drive device 7 supplies a DC current to the main coil Lh of the magnetic head 3 in accordance with the control signal from the CPU 10, and the magnetic head 3 generates a given magnetic field in one direction and perpendicularly applies it to that portion of the magnetic layer 12, which is irradiated with the laser beam.

Note that the magnetization in a local region of the reproduction layer, which has reached a high temperature upon irradiation of the laser beam, is switched in the direction of the applied magnetic field, irrespective of the magnetization formed in the recording layer. Also, since the plane of polarization of the laser beam reflected by the non-high-temperature region of the reproduction layer rotates in correspondence with the direction of magnetization corresponding to the recorded information signal, it is detected by the photosensor 6, and the reproducing circuit 9 reproduces the information signal on the basis of the detection signal from the photosensor 6 and outputs it from a terminal T7. According to such superresolution reproduction, a magnetic domain smaller than the beam spot size can be detected. In this magneto-optical recording apparatus, a first operation mode will be referred to as a magnetic field modulation recording mode, and a second operation mode will be referred to as a superresolution reproduction mode.

Figure 2:
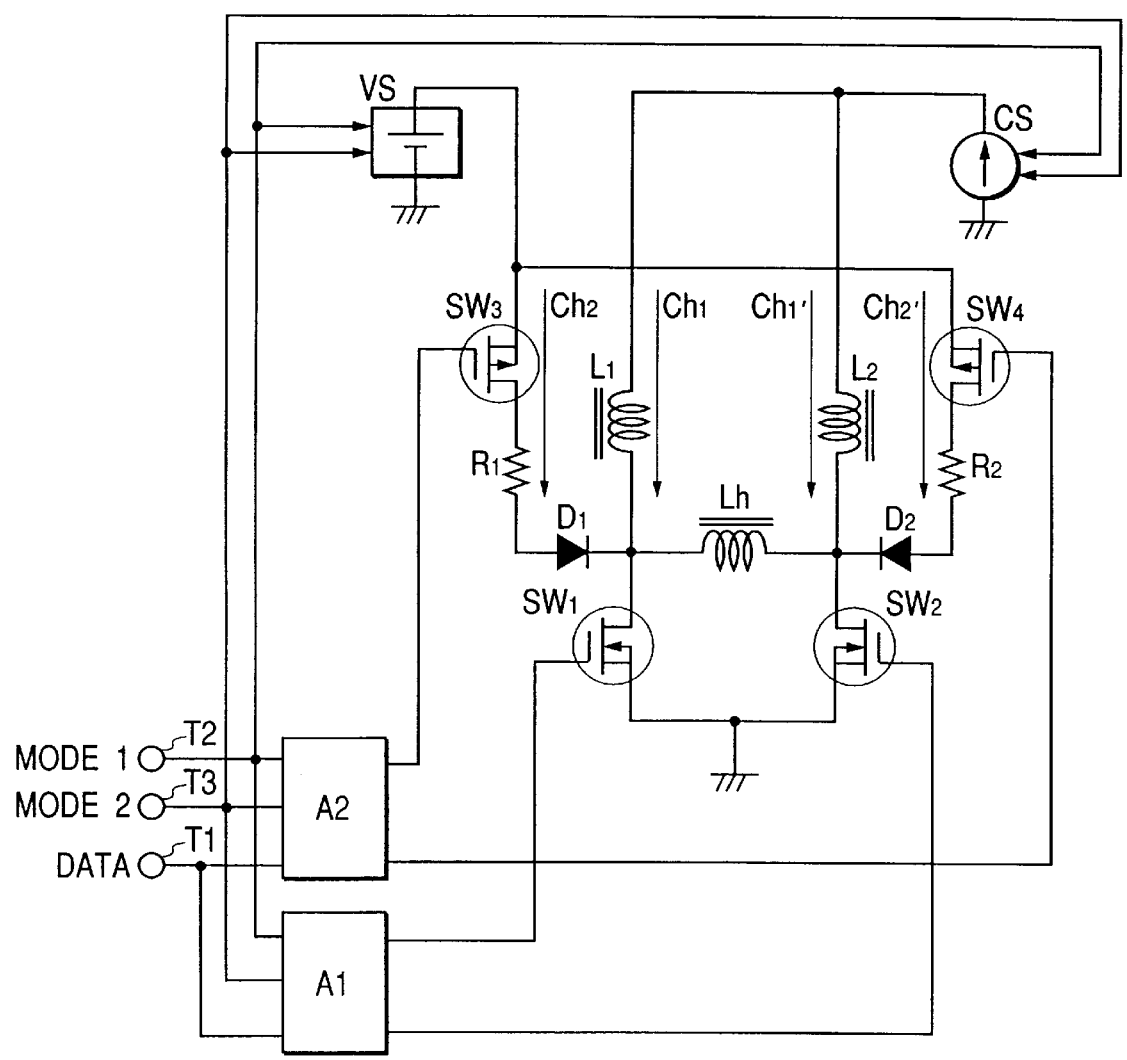
FIG. 2 is a circuit diagram showing a magnetic head drive device according to the first embodiment of the present invention.

FIG. 2 shows an example of the arrangement of the magnetic head drive device 7. In FIG. 2, the following four current supply channels are prepared as those for supplying a drive current to the main coil Lh for magnetic field generation: a first current channel Ch1 including an auxiliary coil L1, a third current channel Ch2 connected in parallel with the first current channel Ch1, a second current channel Ch1' including an auxiliary coil L2, and a fourth current channel Ch2' connected in parallel with the second current channel Ch1'. A first current source (constant current source) CS supplies a current to the first and second current channels Ch1 and Ch1'. The third current channel Ch2 is constituted by a switch element SW3, resistor R1, and diode D1, and the fourth current channel Ch2' is constituted by a switch element SW4, resistor R2, and diode D2.

A second current source (variable voltage power supply) VS supplies a current to the third and fourth current channels. A switch element SW1 is connected between one terminal of the main coil Lh and ground, and a switch element SW2 is connected between the other terminal of the main coil Lh and ground. N-channel MOS-FETs are used as the switch elements SW1 and SW2, and p-channel MOS-FETs are used as the switch elements SW3 and SW4. A switch drive circuit A1 drives the switch elements SW1 and SW2, and a switch drive circuit A2 drives the switch elements SW3 and SW4. The drive device 7 has the terminals T1 to T3, as described above, and the terminal T1 receives an information signal DATA from a recording signal generator (not shown). The information signal DATA is input to the switch drive circuits A1 and A2. The terminals T2 and T3 receive control signals MODE1 and MODE2, which designate the operation mode, from the CPU 10. These control signals are input to the first current source CS, second current source VS, and switch drive circuits A1 and A2.

Figure 3:
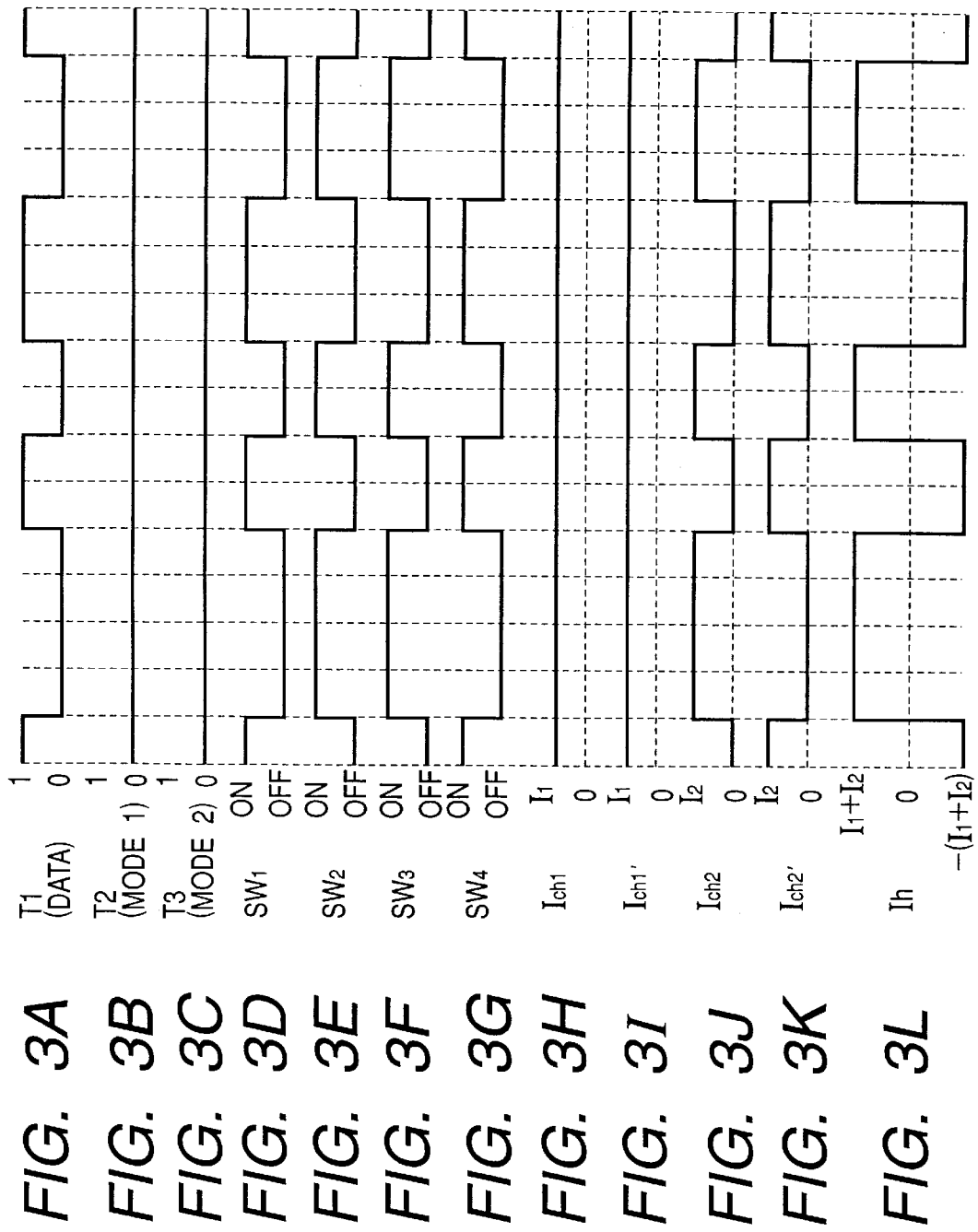
FIGS. 3A, 3B, 3C, 3D, 3E, 3F, 3G, 3H, 3I, 3J, 3K and 3L are charts showing signals of the respective units when the magnetic head drive device shown in FIG. 2 is set in a first operation mode.

The operation of the magnetic head drive device 7 in the magnetic field modulation recording mode as the first operation mode will be explained below. FIGS. 3A to 3L show the signal waveforms of the respective units in the first operation mode. FIG. 3A shows the information signal DATA, FIG. 3B the control signal MODE1, and FIG. 3C the control signal MODE2. When both the control signals MODE1 and MODE2 input from the terminals T2 and T3 are set at "0", the first operation mode is designated. When the first operation mode is designated, the switch drive circuit A1 ON/OFF-controls the switch elements SW1 and SW2 in accordance with the information signal DATA, as shown in FIGS. 3D and 3E. When the information signal DATA is 0, the switch element SW1 is OFF and the switch element SW2 is ON; when the information signal DATA is 1, the switch element SW1 is ON and the switch element SW2 is OFF.

On the other hand, when the first operation mode is designated, the first current source CS is controlled to generate a constant current 2I1. The current generated by the first current source CS is equally shunted into two currents, which are supplied to the first and second current channels Ch1 and Ch1'. As a consequence, as shown in FIGS. 3H and 3I, both a current Ich1 of the first current channel Ch1 and a current Ich1' of the second current channel Ch1' are held at a constant value I1.

As shown in FIGS. 3D and 3E, when the switch element SW1 is OFF and the switch element SW2 is ON, the first current source CS supplies a current I1 to the main coil Lh via the first current channel Ch1; when the switch element SW1 is ON and switch element SW2 is OFF, the first current source CS supplies a current –I1 to the main coil Lh via the second current channel Ch1'. Note that the current supplied from the first current channel Ch1 to the main coil Lh has a positive sign in this case. Since the first and second current channels Ch1 and Ch1' include the auxiliary coils L1 and L2, their loads change if the average frequency of the information signal to be recorded changes. Therefore, in order to maintain the currents Ich1 and Ich1' of the first and second current channels Ch1 and Ch1' constant even when the average frequency of the recording signal changes, the first current source CS preferably comprises a constant current power supply having a control function of maintaining the output current constant.

When the first operation mode is designated, the second current source VS is controlled to generate a constant voltage V1. At the same time, the switch drive circuit A2 ON/OFF-controls the switch elements Sw3 and SW4 in accordance with the information signal DATA, as shown in FIGS. 3F and 3G. When the information signal DATA is 0, the switch element SW3 is ON, and the switch element SW4 is OFF. As a result, a current Ich2 of the third current channel Ch2 is I2, as shown in FIG. 3J, and the fourth current channel Ch2' is shut off, as shown in FIG. 3K.

On the other hand, when the information signal DATA is 1, the switch element SW3 is OFF, and the switch element SW4 is ON. In this case, the third current channel Ch2 is shut off, as shown in FIG. 3J, and a current Ich2' of the current channel Ch2' becomes I2, as shown in FIG. 3K. Note that the current value I2 becomes nearly equal to V1/R (R is the resistance of the resistors R1 and R2). Hence, when the information DATA is 0, the second current source VS supplies a current I2 to the main coil Lh via the third current channel Ch2; when the information signal DATA is 1, the second current source VS supplies a current –I2 to the main coil Lh via the fourth current channel Ch2'. Note that the current supplied from the third current channel Ch2 to the main coil Lh has a positive sign in this case.

With this control, when the information signal DATA is 0, the currents Ich1 and Ich2 are supplied to the main coil Lh via the first and third current channels Ch1 and Ch2, and a current Ih supplied to the main coil Lh becomes I1+I2, as shown in FIG. 3L. On the other hand, when the information signal DATA is 1, the currents Ich1' and Ich2' are supplied to the main coil Lh via the second and fourth current channels Ch1' and Ch2', and a current Ih supplied to the main coil Lh becomes –(I1+I2), as shown in FIG. 3L. In this way, the current Ih supplied to the main coil Lh is ±(I1+I2), and the supply direction is switched in correspondence with the information signal. As a result, the magnetic head 3 generates a magnetic field modulated by the information signal, and applies it to the disk 1. Note that the current 2I1 generated by the first current source CS and the voltage V1 generated by the second current source VS are set so that the magnetic field generated by the magnetic head 3 has an optimal strength upon recording the information signal.

At the time of switching the direction of the current Ih to be supplied to the main coil Lh, the current Ih of the main coil Lh produces oscillations of a short period due to the inductance of the main coil Lh, the inter-terminal capacitances of the switch elements SW1 and SW2 (e.g., the drain-source capacitances of the MOS-FETs), and the like. For example, if the current value Ih of the main coil Lh before current switching is –(I1+I2), the current value obtained by oscillations of the main coil Lh assumes a maximal value (I1+I2–ΔI) a half period after the beginning of the oscillations, and is shorter by ΔI than the predetermined current value I1+I2. Note that ΔI corresponds to electromagnetic energy of the magnetic head, which is lost upon current switching.

Since the auxiliary coils L1 and L2 have constant current characteristics, switching of currents to be supplied to the main coil Lh via the first and second current channels Ch1 and Ch1' is much faster than that of currents to be supplied to the main coil Lh via the third and fourth current channels Ch2 and Ch2'. Hence, the current Ih of the main coil Lh assumes a value obtained by adding the current I1 supplied via the first current channel Ch1 to the current (I1+I2–ΔI) due to oscillations a half period after the beginning of the current oscillations of the main coil Lh.

For this reason, when the value I1 of the currents Ich1 and Ich1' supplied to the main coil Lh via the current channels Ch1 and Ch1' is set to be nearly equal to ΔI, the current Ih of the main coil Lh can rapidly reach the predetermined current value I1+I2 to complete current switching. Upon completion of current switching, the current Ich1 or Ich1' supplied via the first or second current channel Ch1 or Ch1', and the current Ich2 or Ich2' supplied via the third or fourth current channel Ch2 or Ch2' can hold the current Ih of the main coil Lh at a predetermined current value. In this way, since a current nearly equal to the current ΔI corresponding to electromagnetic energy of the magnetic head lost upon current switching is supplied to the main coil Lh via the first and second current channels Ch1 and Ch1' including the auxiliary coils L1 and L2, currents can be switched at high speed without wasting electric power and increasing the consumption power of the device, thus improving the recording speed of the information signal.

Figure 4:
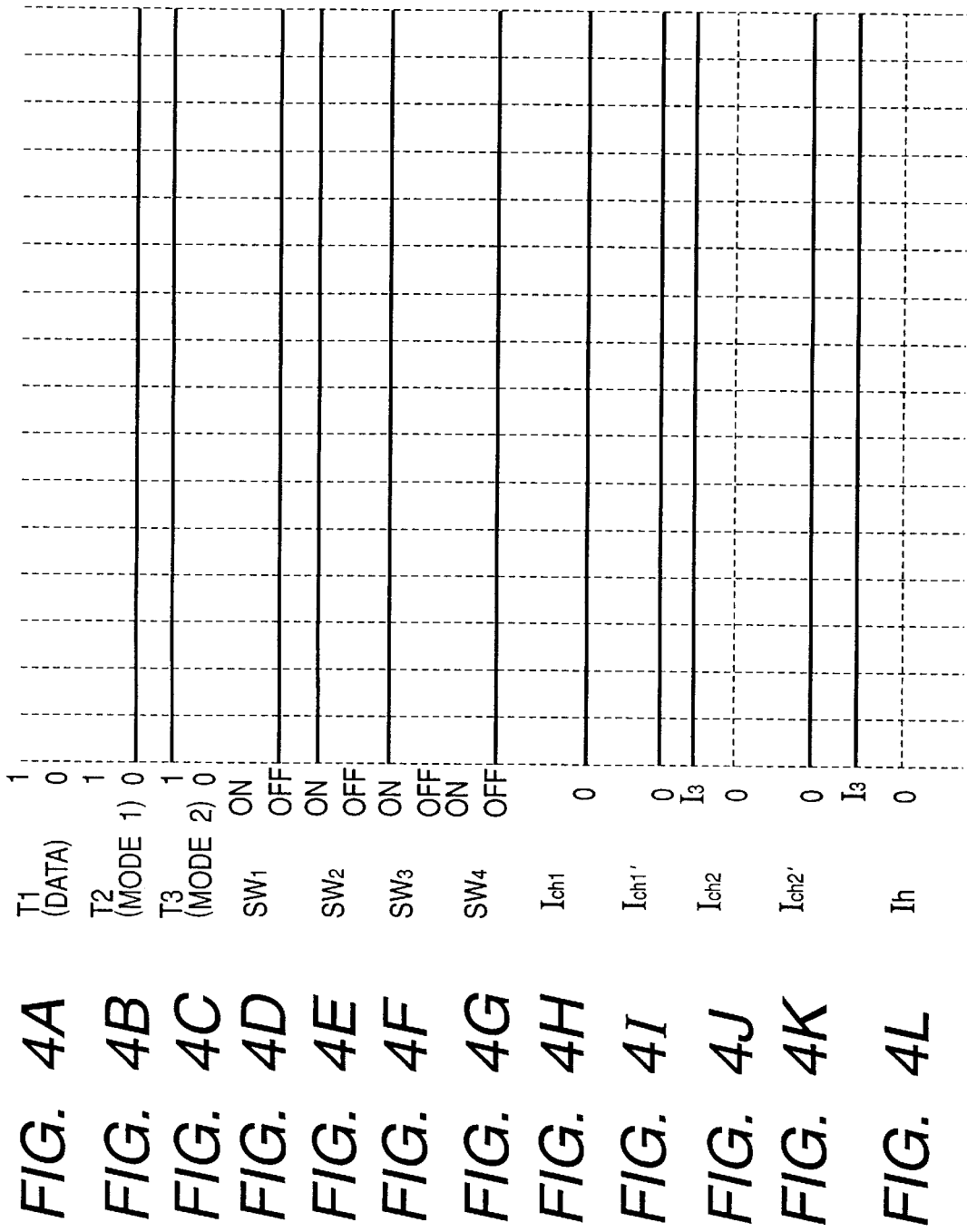
FIGS. 4A, 4B, 4C, 4D, 4E, 4F, 4G, 4H, 4I, 4J, 4K and 4L are charts showing signals of the respective units when the magnetic head drive device shown in FIG. 2 is set in a second operation mode.

The operation of the magnetic head drive device 7 in the superresolution reproduction mode as the second operation mode will be explained below. FIGS. 4A to 4L show the signal waveforms of the respective units in the second operation mode, and respectively correspond to FIGS. 3A to 3L. As shown in FIGS. 4B and 4C, when the control signals MODE 1 and MODE2 input from the terminals T2 and T3 are respectively set at "0" and "1", the second operation mode is designated. When the second operation mode is designated, the switch drive circuit A1 is controlled to hold the switch element SW1 OFF and the switch element SW2 ON, as shown in FIGS. 4D and 4E. No signal is input to the terminal T1, or a signal is not referred to if it is input thereto, as shown in FIG. 4A.

When the second operation mode is designated, the first current source CS is controlled to generate a sufficiently small current or no current. As a result, as shown in FIGS. 4H and 4I, both the currents Ich1 and Ich1' of the first and second current channels Ch1 and Ch1' become sufficiently small or zero. Furthermore, when the second operation mode is designated, the second current source VS is controlled to generate a constant voltage V2. At the same time, the switch drive circuit A2 is controlled to maintain the switch element SW3 ON and the switch element SW4 OFF, as shown in FIGS. 4F and 4G. As a result, the current Ich2 of the third current channel Ch2 becomes I3, as shown in FIG. 4J, and the current channel Ch2' is shut off, as shown in FIG. 4K. Note that the current value I3 becomes roughly equal to V2/R (R is the resistance of the resistors R1 and R2).

With this control, the current Ich2 is mainly supplied to the main coil Lh via the third current channel Ch2, and the current Ih supplied to the main coil Lh becomes I3, as shown in FIG. 4L. Consequently, the magnetic head 3 generates a constant magnetic field in one direction, and applies it to the disk 1. Note that the voltage V2 generated by the second current source VS is set so that the magnetic field generated by the magnetic head 3 has a strength optimal to superresolution reproduction. In order to set the current Ich2 of the third current channel Ch2 or the current Ich2' of the fourth current channel Ch2' at an optimal current value in correspondence with the operation mode, the second current source VS preferably comprises a constant voltage power supply having a function of switching the output voltage in correspondence with the input control signals MODE1 and MODE2.

To recapitulate, in the first operation mode according to this embodiment, since the current modulated by the information signal is supplied to the main coil Lh, the magnetic head 3 generates a magnetic field modulated by the information signal. On the other hand, in the second operation mode, since a DC current is supplied to the main coil Lh in one direction, the magnetic head 3 generates a constant magnetic field in one direction. Hence, the magnetic head and magnetic head drive device used in recording based on magnetic field modulation and reproduction based on superresolution need not be independently equipped and the apparatus can be realized by a simple arrangement. In addition, since the respective units are controlled not to supply unnecessary currents in each operation mode, the recording speed in magnetic field modulation recording can be improved without increasing the consumption power of the apparatus. In the first embodiment, the magnetic modulation recording mode is used as the first operation mode, and the superresolution reproduction mode is used as the second operation mode. However, the present invention may be applied to a magneto-optical recording apparatus having other operation modes. Such an embodiment will be explained below.

The assignee of the application has proposed a domain wall displacement reproduction scheme as a novel reproduction scheme that can detect a magnetic domain smaller than the beam spot size (Japanese Patent Laid-Open Application No. 6-290496). An example that can be applied to reproduction of an information signal using such a domain wall displacement reproduction scheme will be explained below as the second embodiment. In the second embodiment, the magnetic layer 12 constituting the disk 1 comprises a plurality of layers including at least a recording layer and domain wall displacement layer. Other arrangements of the magneto-optical recording apparatus are substantially the same as those in FIG. 1, and a detailed description thereof will be omitted.

When an information signal is recorded by magnetic field modulation, the laser drive circuit 8 supplies a DC current or a pulse current synchronous with a clock signal to the laser light source 5 in accordance with the control signal from the CPU 10, while the disk 1 is driven to rotate by the spindle motor 2. In this manner, the laser light source 5 produces a high-power laser beam which is constant or pulse-modulated by the clock signal, and this laser beam is focused to a small beam spot by the optical system and is irradiated onto the magnetic layer 12. At the same time, the magnetic head drive device 7 supplies a current modulated according to the information signal to be recorded to the main coil Lh of the magnetic head 3. In this manner, the magnetic head 3 generates a magnetic field modulated according to the information signal, and perpendicularly applies it to that portion of the magnetic layer 12, which is irradiated with the laser beam. As a result, a magnetic domain, in which the direction of magnetization changes in correspondence with the direction of magnetic field applied, is formed in the recording layer constituting the magnetic layer 12, and the magnetization formed in the recording layer is transferred to the domain wall displacement layer. A magnetic wall is formed at the boundary portions between the magnetic domain and the neighboring magnetic domains. In this manner, the information signal is recorded on the magnetic layer of the disk 1.

When the recorded information signal is reproduced by domain wall displacement reproduction, the laser drive circuit 8 supplies a DC current to the laser light source 5 while rotating the disk 1, and the laser light source 5 generates a lower-power laser beam. The laser beam is focused to a small beam spot by the optical system, and is irradiated onto the magnetic layer 12. Upon irradiation of the laser beam, the magnetic layer 12 is heated and formed with a temperature distribution having a peak offset from the beam spot center to its rear end relatively in the moving direction. At a position separated from the beam spot, the temperature of the magnetic layer 12 is sufficiently low, and the domain wall displacement layer and recording layer are magnetically coupled to each other. Also, since the temperature distribution of the magnetic layer 12 is nearly uniform, no force for displacing a magnetic wall transferred to the domain wall displacement layer acts, and the magnetic wall is fixed in position.

Upon rotation of the disk 1, a force resulting from the temperature gradient acts on the magnetic wall of the domain wall displacement layer which is approaching from the front end side of the beam spot. As a consequence, in the domain wall displacement layer, the magnetic wall moves toward a temperature peak position having a higher temperature and lower magnetic wall energy. As a result, a magnetic domain expanded to a predetermined size is formed on that portion of the domain wall displacement layer, which is irradiated with the laser beam, irrespective of the original magnetic domain size. In this way, the magnetic wall transferred to the domain wall displacement layer moves toward the temperature peak position and forms an expanded magnetic domain every time it approaches the beam spot upon rotation of the disk 1.

Since the plane of polarization of the laser beam reflected by the expanded magnetic domain rotates in correspondence with the direction of magnetization, it is detected by the photosensor 6, and the reproducing circuit 9 reproduces an information signal based on the detection signal and outputs it from the terminal T7.

The displacement speed of the magnetic wall is sufficiently higher than the relative movement of the beam spot. Hence, a change in detection signal upon displacement of the magnetic wall is very fast. Even when the original length of the recorded magnetic domain is smaller than the diameter of the beam spot, since such a magnetic domain is detected after it is expanded to a predetermined size, the amplitude of the detection signal can be prevented from being decreased.

Therefore, according to the domain wall displacement reproduction scheme, a detection signal having a given amplitude and a nearly rectangular waveform can be obtained even from a magnetic domain smaller than the beam spot size.

However, in the domain wall displacement reproduction scheme, displacement of a magnetic wall from a position behind the temperature peak position toward the temperature peak position (second domain wall displacement) may take place in addition to the displacement of a magnetic wall from a position in front of the temperature peak position toward the temperature peak position (first domain wall displacement). In such a case, a signal produced by the second domain wall displacement is mixed in a signal produced by the first domain wall displacement, and such signal is detected by the optical head, thus disturbing accurate reproduction of an information signal. In order to solve this problem, the assignee of the application has filed an application for a scheme for preventing the second domain wall displacement by applying a magnetic field to the disk 1 upon reproduction by domain wall displacement reproduction in Japanese Patent Application No. 9-235885.

In this embodiment, upon applying a magnetic field to the disk to prevent the second domain wall displacement, the magnetic head drive device is set in the second operation mode to attain this. That is, upon reproduction of an information signal by the domain wall displacement reproduction, the magnetic head drive device 7 supplies a DC current to the main coil Lh of the magnetic head 3 simultaneously with irradiation of a laser beam. In this manner, the magnetic head 3 generates a given magnetic field, and perpendicularly applies it to that portion of the magnetic layer 12, which is irradiated with the laser beam. As a result, the second domain wall displacement can be prevented, and a signal produced by the first domain wall displacement alone is detected, thus allowing accurate reproduction of an information signal.

In a magneto-optical recording apparatus adapted to utilize such a domain wall displacement reproduction scheme, the magnetic field modulation recording mode is used as the first operation mode, and the domain wall displacement reproduction mode is used as the second operation mode. The arrangement of the magnetic head drive device 7 is the same as that shown in FIG. 2, and its operation is basically the same as that in the first embodiment. That is, when both the control signals MODE1 and MODE2 input from the terminals T2 and T3 are set at "0", the first operation mode is designated. In the first operation mode, a drive current ±(I1+I2) modulated according to the information signal is supplied to the main coil Lh, as shown in FIG. 3L, and the magnetic head 3 generates a modulated magnetic field accordingly.

When the control signals MODE1 and MODE2 are respectively set at "0" and "1", the second operation mode is designated. In the second operation mode, a current is supplied to the main coil Lh in one direction, as shown in FIG. 4L, and the magnetic head 3 generates a constant magnetic field accordingly. By applying the constant magnetic field to the disk 1, the second domain wall displacement can be prevented, as described above. In the second operation mode, the second current source VS generates a constant voltage V3, which is set so that the magnetic field generated by the magnetic head 3 has a strength optimal to reproduce an information signal by domain wall displacement reproduction.

In this embodiment as well, the magnetic head and magnetic head drive device used in recording based on magnetic field modulation and reproduction based on domain wall displacement reproduction need not be independently equipped and the apparatus can be realized by a simple arrangement. In addition, since the respective units are controlled not to supply unnecessary currents in each operation mode, the recording speed in magnetic field modulation recording can be improved without increasing the consumption power of the apparatus.

Figure 5:
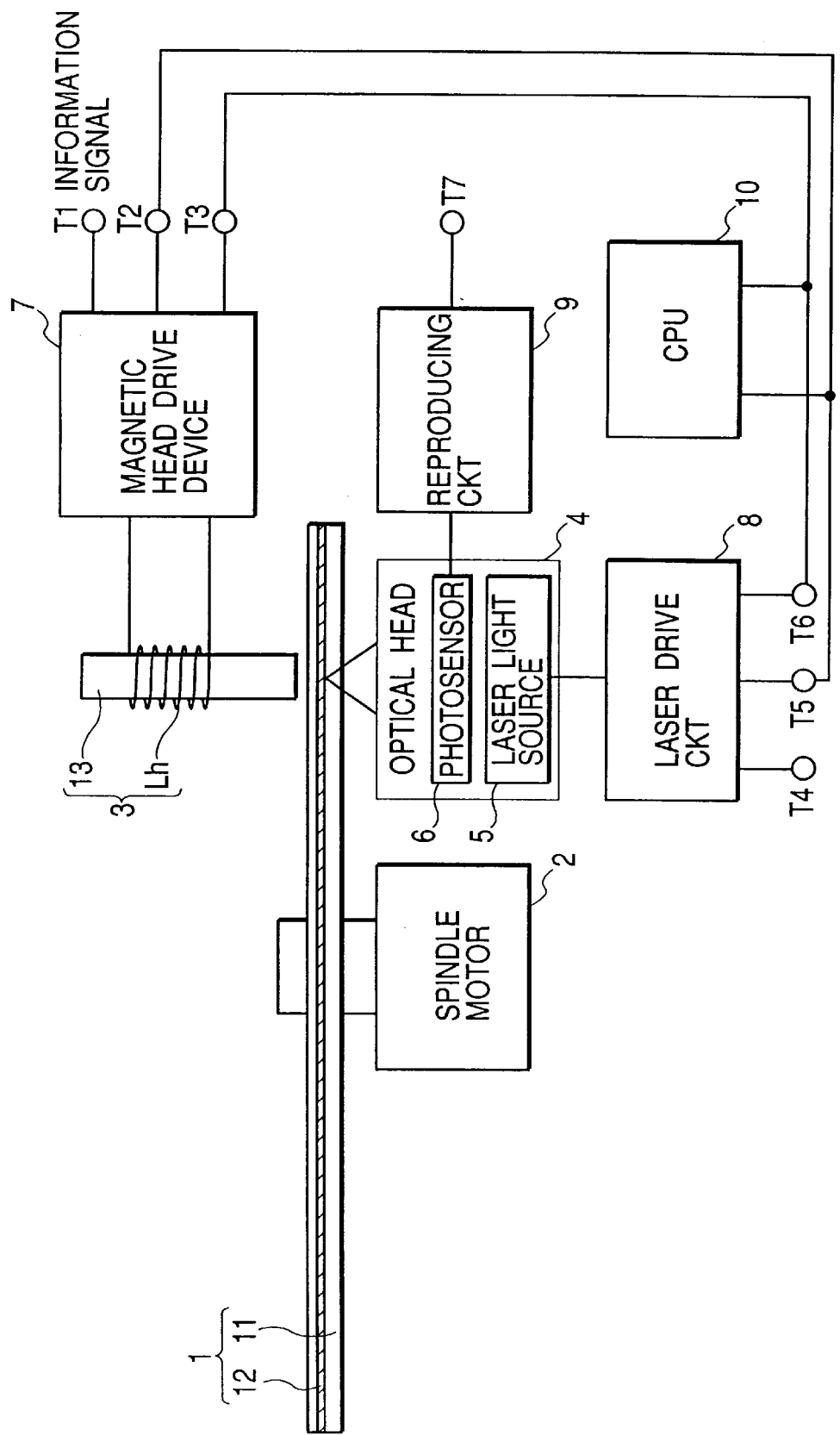
FIG. 5 is a block diagram showing a magneto-optical recording apparatus according to the third embodiment of the present invention.

The third embodiment of the present invention will be described below. In the third embodiment, the present invention is applied to a magneto-optical recording apparatus which can selectively record by magnetic field modulation or by optical modulation. FIG. 5 shows the arrangement of a magneto-optical recording apparatus according to the third embodiment of the present invention. The same reference numerals in FIG. 5 denote the same parts as in FIG. 1. In FIG. 5, a magnetic head drive device 7 and laser drive circuit 8 operate on the basis of control signals output from a CPU (Central Processing Unit) 10. The magnetic head drive device 7 has a terminal T1 which receives an information signal, and terminals T2 and T3 which receive a control signal from the CPU 10. The laser drive circuit 8 has a terminal T4 which receives an information signal, and terminals T5 and T6 which receive a control signal from the CPU 10.

When an information signal is recorded by magnetic field modulation, the laser drive circuit 8 supplies a DC current or a pulse current synchronous with a clock signal to a laser light source 5 in accordance with the control signal from the CPU 10, while a disk 1 is driven to rotate by a spindle motor 2. In this manner, the laser light source 5 produces a high-power laser beam which is constant or pulse-modulated by the clock signal. This laser beam is focused to a small beam spot by an optical system and is irradiated onto a magnetic layer 12. At the same time, the magnetic head drive device 7 supplies a current modulated according to the information signal to be recorded to a main coil Lh of a magnetic head 3 in accordance with the control signal from the CPU 10. In this manner, the magnetic head 3 generates a magnetic field modulated according to the information signal, and perpendicularly applies it to that portion of the magnetic layer 12, which is irradiated with the laser beam. As a result, a magnetic domain, in which the direction of magnetization changes in correspondence with the direction of magnetic field applied, is formed in the magnetic layer 12, thus recording the information signal.

When an information signal is recorded by optical modulation, the laser drive circuit 8 supplies a current modulated according to the information signal to be recorded to the laser light source 5 in accordance with the control signal from the CPU 10, while the disk 1 is driven to rotate by the spindle motor 2, and the laser light source 5 generates a high-power laser beam modulated according to the information signal. This laser beam is focused to a small beam spot by an optical system and is irradiated onto a magnetic layer 12. At the same time, the magnetic head drive device 7 supplies a DC current to the main coil Lh of the magnetic head 3 in response to the control signal from the CPU 10. In this manner, the magnetic head 3 generates a magnetic field of a given strength in a predetermined direction opposite to the direction of magnetization of the magnetic layer 12 in the erased state, and perpendicularly applies it to that portion of the magnetic layer 12, which is irradiated with the laser beam. As a consequence, a magnetic domain, in which the direction of magnetization changes in correspondence with the information signal, is formed in the magnetic layer 12, thus recording the information signal.

When the recorded information signal is normally reproduced, the laser drive circuit 8 supplies a DC current to the laser light source 5 in accordance with the control signal from the CPU 10 while the disk 1 is driven to rotate, and the laser light source 5 generates a lower-power laser beam. This laser beam is focused to a small beam spot by an optical system and is irradiated onto a magnetic layer 12. In this case, the magnetic head drive device 3 does not supply any current to the main coil Lh of the magnetic head 3 in accordance with the control signal from the CPU 10, and the magnetic head 3 does not generate any magnetic field.

Since the plane of polarization of the laser beam reflected by the magnetic layer 12 rotates in correspondence with the direction of magnetization, it is detected by a photosensor 6, and a reproducing circuit 9 reproduces an information signal based on the detection signal and outputs it from a terminal T7. Note that normal reproduction is a generally known reproduction scheme for a magneto-optical recording medium, which does not require application of a magnetic field. Furthermore, when the recorded information is erased, the laser drive circuit 8 supplies a DC current to the laser light source 5 in accordance with the control signal from the CPU 10 while the disk 1 is driven to rotate by the spindle motor 2, and the laser light source 5 generates a constant high-power laser beam. The laser beam is focused to a small beam spot by an optical system and is irradiated onto a magnetic layer 12.

At the same time, the magnetic head drive device 7 supplies a DC current to the main coil Lh of the magnetic head 3 in accordance with the control signal from the CPU 10. In this manner, the magnetic head 3 generates a magnetic field of a given strength in a predetermined direction agreeing with the direction of magnetization of the magnetic layer 12 in the initial (erase) state, and perpendicularly applies it to that portion of the magnetic layer 12, which is irradiated with the laser beam. As a result, the direction of magnetization of the magnetic layer 12 aligns uniformly, and the information signal is erased. In this embodiment, the magnetic field modulation recording mode is used as the first operation mode, the optical modulation recording mode is used as the second operation mode, the erase mode is used as the third operation mode, and the normal reproduction mode is used as the fourth operation mode. The operation of the magnetic head drive device 7 will be described in detail below. Since the arrangement of the magnetic head drive device 7 is the same as that shown in FIG. 2, a detailed description thereof will be omitted.

In the magnetic field modulation recording mode as the first operation mode, both control signals MODE1 and MODE2 input from the terminals T2 and T3 are set at "0". The operation of the magnetic head drive device 7 in the first operation mode is the same as that in the first embodiment.

In the optical modulation recording mode as the second operation mode, the control signals MODE1 and MODE2 input from the terminals T2 and T3 are respectively set at "0" and "1". The operation of the magnetic head drive device in the second operation mode is the same as that in the first embodiment. That is, by supplying a current in a predetermined direction to the main coil Lh, the magnetic head 3 generates a magnetic field for optical modulation recording in the predetermined direction, and applies it to the disk. Note that the second current source VS generates a predetermined voltage V4, which is set so that the magnetic field generated by the magnetic head 3 has a strength optimal to record the information signal by optical modulation.

The operation in the erase mode as the third operation mode will be described below. FIGS. 6A to 6L show the signals of the respective units in the erase mode. In the erase mode, the control signals MODE1 and MODE2 input from the terminals T2 and T3 are respectively set at "1" and "0", as shown in FIGS. 6B and 6C. When the third operation mode is designated, the switch drive circuit A1 is controlled to set the switch element SW1 ON and switch element SW2 OFF, as shown in FIGS. 6D and 6E. No signal is input to the terminal T1, or a signal is not referred to if it is input thereto, as shown in FIG. 6A.

In the third operation mode, the first current source CS is controlled to generate a sufficiently small current or no current. As a result, as shown in FIGS. 6H and 6I, both currents Ich1 and Ich1' of the first and second current channels Ch1 and Ch1' become sufficiently small or zero. On the other hand, the second current source VS is controlled to generate a constant voltage V5. At the same time, the switch drive circuit A3 is controlled to hold the switch element SW3 OFF and the switch element SW4 ON, as shown in FIGS. 6F and 6G. With this control, the third current channel Ch2 is shut off, as shown in FIG. 6J, and a current Ich2' of the fourth current channel Ch2' becomes I6, as shown in FIG. 6K. Note that the current value I6 becomes roughly equal to V5/R (R is the resistance of the resistors R1 and R2).

With this control, the main coil Lh mainly receives the current Ich2' via the fourth current channel Ch2', and a current Ih supplied to the main coil Lh becomes –I6. As a result, the magnetic head 3 generates an erase magnetic field of a given strength in a predetermined direction opposite to that in the second operation mode, and applies it to the disk 1. Note that the voltage V5 generated by the second current source VS is set so that the magnetic field generated by the magnetic head 3 has a strength optimal to erase the information signal.

The control operation of the magnetic head drive device 7 in the normal reproduction mode as the fourth operation mode will be explained below. In the fourth operation mode, both the control signals (MODE1, MODE2) respectively input from the terminals T2 and T3 are set at "1". When the fourth operation mode is designated, the switch drive circuit A1 turns off both the switch elements SW1 and SW2. With this operation, no current is supplied to the main coil Lh, and the magnetic head 3 generates no magnetic field. The first current source CS or second current source VS may be controlled not to supply a current to the main coil Lh. The fourth operation mode may be defined as a halt mode in which none of recording, reproduction, and erasure of information are done, in addition to the normal reproduction mode.

To restate, according to this embodiment, recording by magnetic field modulation, recording by optical modulation, and erasure of the recorded information signal can be attained using a single magnetic head and single magnetic head drive device, and the apparatus arrangement can be simplified. In addition, since the respective units are controlled not to supply unnecessary currents in each operation mode, the recording speed in magnetic field modulation recording can be improved without increasing the consumption power of the apparatus.

As described above, according to the present invention, since a modulated current or a current in a predetermined direction is supplied to the main coil of the magnetic head in correspondence with the operation mode, a single magnetic head and its drive device can provide a magnetic field modulation recording magnetic field, and other magnetic fields, i.e., a superresolution reproduction magnetic field, domain wall displacement reproduction magnetic field, optical modulation recording magnetic field, and erase magnetic field. Hence, in an apparatus for performing recording by magnetic field modulation and superresolution reproduction, an apparatus for performing recording by magnetic field modulation and domain wall displacement reproduction, an apparatus for performing recording by magnetic field modulation, recording by optical modulation, and erasure, or the like, since a magnetic head and its drive device need not be independently equipped in correspondence with the operation modes, an apparatus with a simple arrangement can be realized.

What is claimed is:

1. A magnetic head drive device comprising:

a magnetic head including a main coil for magnetic field generation;

first current supply means for supplying a current to said main coil from one direction, said first current supply means including a first auxiliary coil;

second current supply means for supplying a current to said main coil from a direction opposite to the one direction, said second current supply means including a second auxiliary coil;

third current supply means, connected in parallel with said first current supply means, for supplying a current to said main coil from the one direction;

fourth current supply means, connected in parallel with said second current supply means, for supplying a current to said main coil from the direction opposite to the one direction; and control means for controlling said first to fourth current supply means in accordance with a control signal for designating an operation mode, wherein when a first operation mode in which said magnetic head generates a modulated magnetic field is designated, said control means controls said first to fourth current supply means to supply a current modulated in accordance with an information signal to be recorded to said main coil, and when a second operation mode in which said magnetic head generates a magnetic field in a predetermined direction is designated, said control means controls said first to fourth current supply means to supply a current to said main coil from one predetermined direction.

2. A device according to claim 1, wherein the second operation mode is one of a superresolution reproduction mode for detecting a magnetic domain smaller than a beam spot size on a recording medium, a domain wall displacement reproduction mode for reproducing information due to displacement of a domain wall, an optical modulation recording mode, and an erase mode for erasing information on a recording medium.

3. A device according to claim 2, wherein in the optical modulation recording mode and erase mode as the second operation mode, directions of currents to be supplied to said main coil are opposite to each other.

4. A device according to claim 1, wherein when a normal information reproduction operation mode is designated, said control means controls said first to fourth current supply means not to supply a current to said main coil.

5. A magneto-optical recording apparatus comprising:

an optical head for irradiating a laser beam onto a magneto-optical recording medium;

a magnetic head including a main coil for magnetic field generation, said magnetic head applying a magnetic field to said magneto-optical recording medium;

first current supply means for supplying a current to said main coil from one direction, said first current supply means including a first auxiliary coil;

second current supply means for supplying a current to said main coil from a direction opposite to the one direction, said second current supply means including a second auxiliary coil;

third current supply means, connected in parallel with said first current supply means, for supplying a current to said main coil from the one direction;

fourth current supply means, connected in parallel with said second current supply means, for supplying a current to said main coil from the direction opposite to the one direction; and control means for controlling said first to fourth current supply means in accordance with a control signal for designating an operation mode, wherein when a first operation mode in which said magnetic head generates a modulated magnetic field is designated, said control means controls said first to fourth current supply means to supply a current modulated in accordance with an information signal to be recorded to said main coil, and when a second operation mode in which said magnetic head generates a magnetic field in a predetermined direction is designated, said control means controls said first to fourth current supply means to supply a current to said main coil from one predetermined direction.

6. An apparatus according to claim 5, wherein the second operation mode is one of a superresolution reproduction mode for detecting a magnetic domain smaller than a beam spot size on a recording medium, a domain wall displacement reproduction mode for reproducing information due to displacement of a domain wall, an optical modulation recording mode, and an erase mode for erasing information on a recording medium.

7. An apparatus according to claim 6, wherein in the optical modulation recording mode and erase mode as the second operation mode, directions of currents to be supplied to said main coil are opposite to each other.

8. An apparatus according to claim 5, wherein when a normal information reproduction operation mode is designated, said control means controls said first to fourth current supply means not to supply a current to said main coil.

* * * * *